United States Patent [19]

Yamaguchi

[11] 4,166,360

[45] Sep. 4, 1979

[54] CHRONOGRAPH

[75] Inventor: Tetsuo Yamaguchi, Yokohama, Japan

[73] Assignee: Tokyo Shibaura Electric Co., Ltd., Japan

[21] Appl. No.: 862,902

[22] Filed: Dec. 21, 1977

[30] Foreign Application Priority Data

Dec. 24, 1976 [JP] Japan ............................... 51/155780

[51] Int. Cl.[2] ........................ G04F 8/00; G04F 10/00; G04F 7/04; G06F 7/38

[52] U.S. Cl. ........................................ 58/39.5; 58/74; 58/145 D; 235/92 GA

[58] Field of Search .................... 58/23 R, 39.5, 50 R, 58/74, 22.9, 145 D, 21.13–21.55; 340/309.1–309.6; 235/92 T, 92 GA; 364/569

[56] References Cited

U.S. PATENT DOCUMENTS

| | | | |
|---|---|---|---|
| 3,781,529 | 12/1973 | Abramson et al. | 235/92 GA |
| 3,961,473 | 6/1976 | Hung | 58/145 D |
| 4,074,117 | 2/1978 | DeLorean et al. | 235/92 T |
| 4,078,374 | 3/1978 | Kondo | 58/23 R |
| 4,089,156 | 5/1978 | Kashio | 58/39.5 |
| 4,104,864 | 8/1978 | Ishikawa et al. | 58/39.5 |
| 4,104,865 | 8/1978 | Sasaki | 58/58 |
| 4,123,896 | 11/1978 | Asano et al. | 58/39.5 |

FOREIGN PATENT DOCUMENTS

| | | |
|---|---|---|
| 44-31790 | 12/1969 | Japan . |
| 50-98379 | 8/1975 | Japan . |
| 51-145364 | 12/1976 | Japan . |

*Primary Examiner*—Vit W. Miska

*Attorney, Agent, or Firm*—Finnegan, Henderson, Farabow & Garrett

[57] ABSTRACT

A chronograph includes a reference time counter for measuring a reference time upon receipt of a reference pulse, a plurality of short time counters for measuring a short time difference occurring between runners upon receipt of the reference pulse, a reference pulse control circuit for controlling the supply of the reference pulse to these counters, and an addition circuit for adding the contents of the reference counter to those of the short time counters successively in response to each addition command. The reference pulse control circuit selects either of the reference counter and the short time counters successively in response to each operation of a first switch of a time measuring operator and further supplies the reference pulse to only the selected counter. The reference time counter stores the resultant time resulting from the addition made responsive to each addition command through the operation of a second switch by a single time measuring operator. The resultant time is sequentially displayed through a display circuit so that a single operator can measure the times of a plurality of runners.

8 Claims, 10 Drawing Figures

CHRONOGRAPH

BACKGROUND OF THE INVENTION

The present invention relates to a chronograph and, more particularly, a chronograph in which the start and stop of timing are automatically performed and a plurality of times of competitors may be measured through measuring the passage of time between the start and stop.

Generally, a chronograph device records the lapsed time of more than one competitor by means of an additional second hand of which start and stop control is possible, like a stop watch, for example. Recently, various circuit techniques of electronic watches have been developed to provide chronographs operating with high precision using electronic circuits.

However, the timing of only one competitor is permitted by using one conventional electronic chronograph. This means that a plurality of chronographs must be used in a case where the times of a plurality of competitors must be simultaneously measured such as, for example, track or swimming. In this case, one timing person or operator is needed for each competitor. More adversely, the precision of the time difference between the first and second competitors, for example, depends largely on the performance of the chronographs used and the ability of the timing operators. On the other hand, the electronic chronograph enjoys an advantage that is can measure the time up to the 1/100 sec. with high precision. In order to record simultaneously a plurality of times with a single chronograph, therefore, a large number of counters must be used, resulting in a complex timing circuit.

SUMMARY OF THE INVENTION

Accordingly, an object of the present invention is to provide a chronograph capable of measuring and recording a plurality of times of competitors by one timing operator.

Another object of the present invention is to provide a chronograph capable of performing the function of several conventional chronographs, but employing a relatively small number of elements additional to those required for a single chronograph.

According to a broad aspect of the invention, there is provided a chronograph for measuring a plurality of times comprising: reference pulse generating means for generating time count reference pulses; reference time counting means for counting the reference pulses to measure a reference time interval; short time counting means counting the reference pulses after the reference time counting means stops its counting operation to measure a short time interval succeeding the reference time interval; first control means including a time count input start button for generating a sequence of first control signals in response to sequential actuation of the start button, the first control signals operating to apply the time count reference signals first to the reference time counting means and then to the short time counting means whereby the reference time interval is measured first followed by measurement of the short time interval; second control means including an addition command start button operable to generate an addition signal; adder means for summing the contents of the reference time counting means and the short time counting means in response to the addition signal; means for transferring the output of the adder means to the reference time counting means; and display means for displaying the contents of the reference time counting means, whereby upon actuation of the second control means the sum of the reference time interval and the short time interval is displayed.

Other objects and features of the present invention will be apparent from the following description taken in connection with the accompanying drawings, in which:

DETAILED DESCRIPTION OF THE PREFERRED EMBODIMENTS

Figure 1:
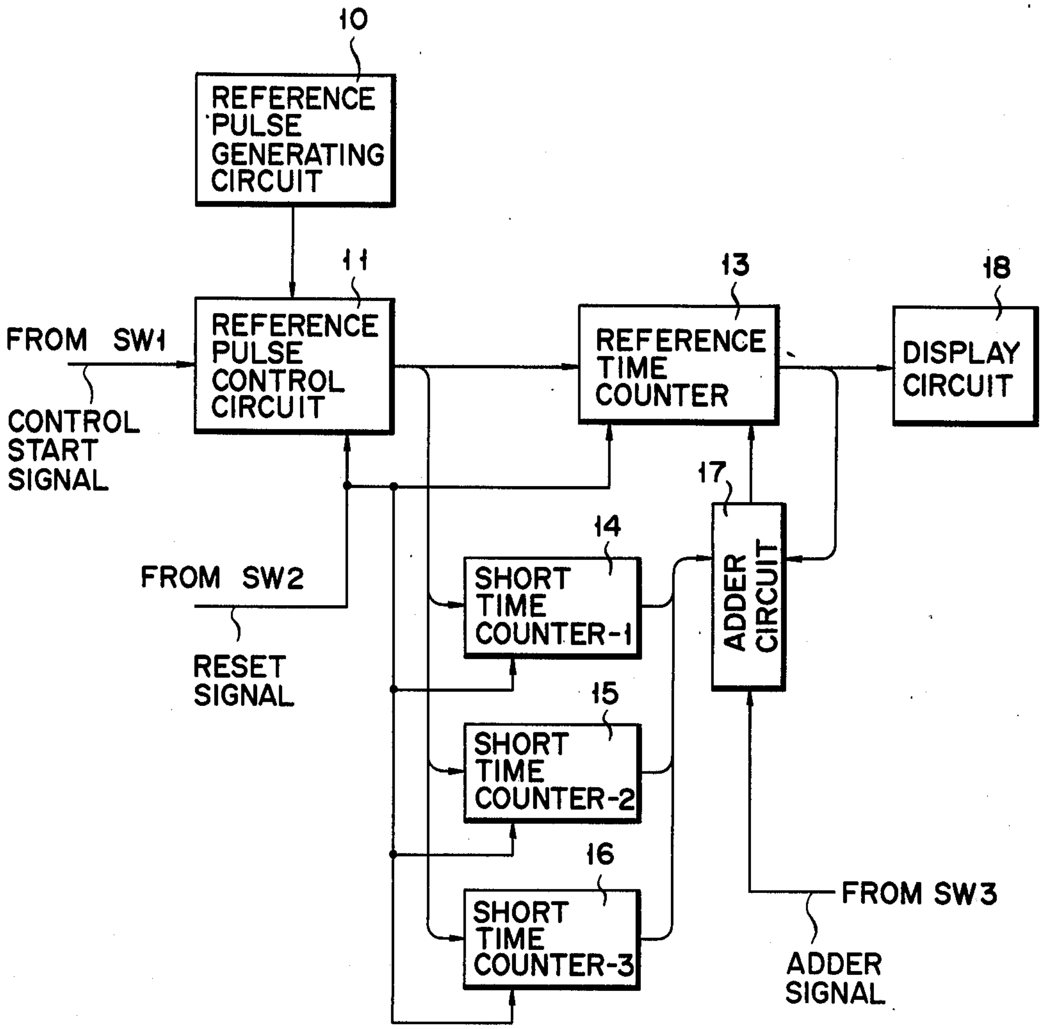
FIG. 1 is a block diagram showing an embodiment of a chronograph according to the present invention.

Referring now to FIG. 1, there is shown a block diagram of a chronograph according to the present invention. In the figure, a reference pulse generating circuit 10 is a circuit for generating reference pulses for timing. The circuit 10, as will be described later, is generally comprised of electronic circuitry including a piezocrystal oscillator and a frequency divider and generates reference pulses at 100 Hz or 10 Hz corresponding to the digits necessary for the desired time measuring precision. A reference pulse control circuit 11 receives the reference pulses to control the times of the start and stop of the supply of the reference pulses and change of the destination of the supply of them. The circuit 11 operates in response to the timing control commencing signal from a timing input start push button switch SW1 and the contents of it is reset by a reset signal from a push button switch SW2. That is, the control circuit 11 successively selects one counter to measure time by a control signal generated each pushing operation of the switch SW1, and successively feeds the reference pulses to the selected counter.

A reference counter 13 counts the reference pulses fed from the reference pulse control circuit 11 to measure the reference time. The counter 13 is selected by a control signal generated through a first pushing of a switch SW1. Short time counters 14, 15 and 16 start the successive timing after the reference time counter 13 stops its timing count. In other words, these counters 14 to 16 are so designed to be selected on the second and subsequent actuations of the switch SW1. These counters also are connected in parallel with the reference time counter 13 and count the reference pulses in the selected order to successively measure time. For example, the counter-1 (14) measures a short time interval and then the counter-2 (15) operates to measure another short time interval. Following this, the counter-3 (16) operates to measure still another short time interval.

Accordingly, these short time counters 14 to 16 measure the time differences between a plurality of times succeeding the operation of the reference time counter 13 after the counter 13 has measured the basic reference time interval. Note here that the short time counters are not limited to the illustrated number of three but may be used with any necessary number, if needed. An adder circuit 17 successively adds the contents of the reference time counter 13 to the contents of the short time counters 14 to 16 in the order of successive addition commands. The result of the addition is stored in the reference time counter 13. The addition operation is executed each time that the adder circuit 17 receives the adder signal generated through the operation of a switch SW3. For example, when the first addition signal is fed to the adder circuit, the contents of the reference time counter 13 and of the short time counter 14 are added and the first addition result is stored in the reference time counter 13. When the second time addition signal is fed to the adder circuit, the contents of the reference time counter 13 (the first addition result) and of the short time counter 15 are added and the second addition result is set into the reference time counter 13. A similar operation results in response to generation of a third addition signal. The display apparatus 18 is connected to the reference counter 13 and successively displays the reference time and the other three added measuring times which are set into the counter 13.

Figure 2:
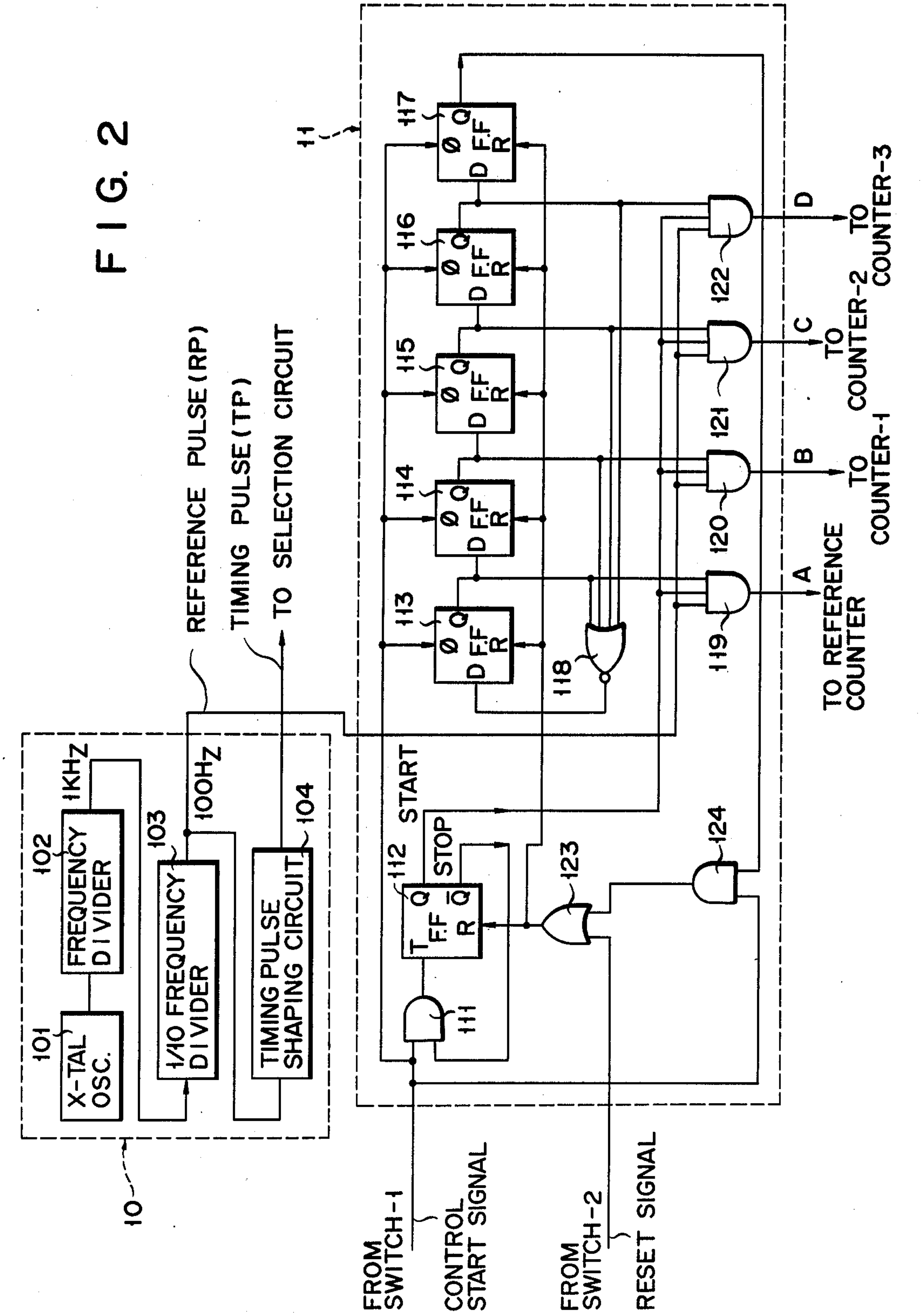
FIG. 2 shows a circuit diagram of a reference pulse generating circuit and a reference pulse control circuit shown in FIG. 1.

Turning now to FIG. 2, there is shown a circuit diagram illustrating the details of the reference pulse generator 10 and the reference pulse control circuit 11. The reference pulse generator 10 comprises, for example, a crystal oscillator 101 operating at the frequency of 512 KHz, a frequency divider 102 for frequency-dividing the frequency of 512 KHz into 1 KHz, a 1/10 frequency divider 103 for frequency-dividing the frequency of 1 KHz from the divider 102 into 100 Hz, and a timing pulse shaper circuit 104 for shaping the output pulse of the divider 103 to form a timing pulse. The pulse generator 10 outputs the reference pulses of 100 Hz while at the same time outputs timing pulses to time the addition digits properly when the contents of the reference time counter 13 and of the short time counters 14 to 16 are added in the addition circuit.

In the reference pulse control circuit 11, a control start signal generated by pushing the input timing start switch SW1 is fed to an AND circuit 111 of which the output is applied to a flip-flop 112 to set it. The flip-flop 112 is a circuit to set the times of start and stop of the reference pulse feeding. Flip-flops 113 to 117 constitute a shift register. The shift register uses as its shift clock pulses the control start signal generated on each actuation of the switch SW1. The Q outputs of the flip-flops 113 to 116 are coupled in common with a NOR circuit 118 and at the same time with AND circuits 119 to 122, respectively. The output of the NOR circuit 118 is fed to flip-flop 113. The reference pulse and the output of the flip-flop 112 are applied to AND circuits 119 to 122. A reset signal generated by pushing the switch 2 goes through an OR circuit 123 to reset the flip-flops 112 to 117. The output of the flip-flop 117 is applied to an AND circuit 124. More particularly, the final stage flip-flop 117 of the shift register is set and then the set output of the flip-flop 117 and the control start signal generated by pushing of the switch SW1 cooperatively condition the AND circuit 124 and the output thereof is used to reset the flip-flops 112 to 117 to return these flip-flops to the initial conditions.

Figure 3:
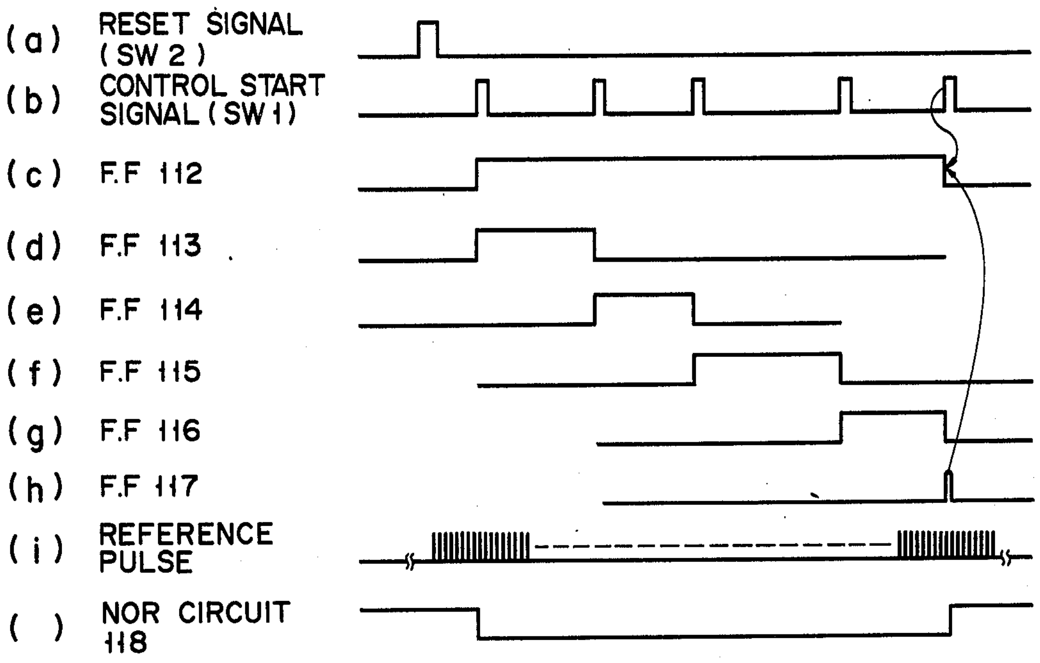
FIG. 3 is a waveform diagram illustrating several timing pulses generated in the operation of the reference pulse control circuit shown in FIG. 2.

The operation of the control circuit 11 will be given with additional reference to the waveform timing diagram of FIG. 3. The switch SW2 is first pushed to generate the reset signal as shown in FIG. 3(*a*). The reset signal is applied to the flip-flops 112 to 117 through the OR circuit 123 to reset these flip-flops. Then, the switch SW1 is pushed to generate the first time control starting signal, as shown in FIG. 3(*b*). The control starting signal resets the flip-flop 112 through the AND circuit 111, as shown in FIG. 3(*c*). Accordingly, the "Q" output of the flip-flop 112 is applied to AND circuits 119 to 122. Since the flip-flops 113 to 116 are in the reset condition, the output of the NOR circuit 118 has been in "1" level as shown in FIG. 3(*k*). Therefore, the control start signal (shift clock pulse) is applied to the flip-flop 113 and at this time the output "1" of the NOR circuit 118 is set in the flip-flop 113, as shown in FIG. 3(*d*). The Q output "1" of the flip-flop 113 has been applied to the AND circuit 119 and therefore only the AND circuit 119 is enabled during the "1" period shown in FIG. 3(*d*). Therefore, the AND circuit 119 feeds the reference pulses to the reference time counter 13 during the flip-flop 113 set period.

On the second actuation of the switch SW1, the Q output "0" of the flip-flop 112 is applied to the AND gate 111 so that the AND circuit 111 outputs logical "0". Therefore, the flip-flop 112 is not changed, as shown in FIG. 3(*c*), and maintains the set condition. However, an information transfer operation is performed between the flip-flops constituting the shift register. That is, at the rise of the control start signal (shift pulse), the "1" stored in flip-flop 113 is shifted to the succeeding stage flip-flop 114 so that the flip-flop 114 outputs "1" as shown in FIG. 3(*e*). The flip-flop 113 is inverted to the "0" state as shown in FIG. 3(*d*) by the "1" output of the NOR circuit 113. Therefore, the "1" output of the flip-flop 114 enables only the AND circuit 120 and, as shown in FIG. 3(*e*), only during the period "1" level, the flip-flop 114 feeds the reference pulses shown in FIG. 3(*i*) to the short time counter 14.

At the third actuation of the switch SW1, the flip-flop 115 switches to the "1" state as shown in FIG. 3(*f*); the AND circuit 121 is thus enabled to feed the reference pulses to the short time counter 15 only during the period of "1" of the flip-flop 115. When the switch SW1 is a fourth time pushed, the flip-flop 116 is set to "1" as shown in FIG. 3(*g*) and the AND circuit 122 is enabled to feed the reference pulses to the short time counter 16. When the switch SW1 is a fifth time pushed, the flip-flop 117 is set to "1" as shown in FIG. 3(*h*). The "1" output of the flip-flop 117 is applied to the AND circuit 124 so that the "1" output of the AND circuit 124 goes to reset the flip-flop 112, as shown in FIG. 3(*b*), through the OR circuit 123.

Figure 4:
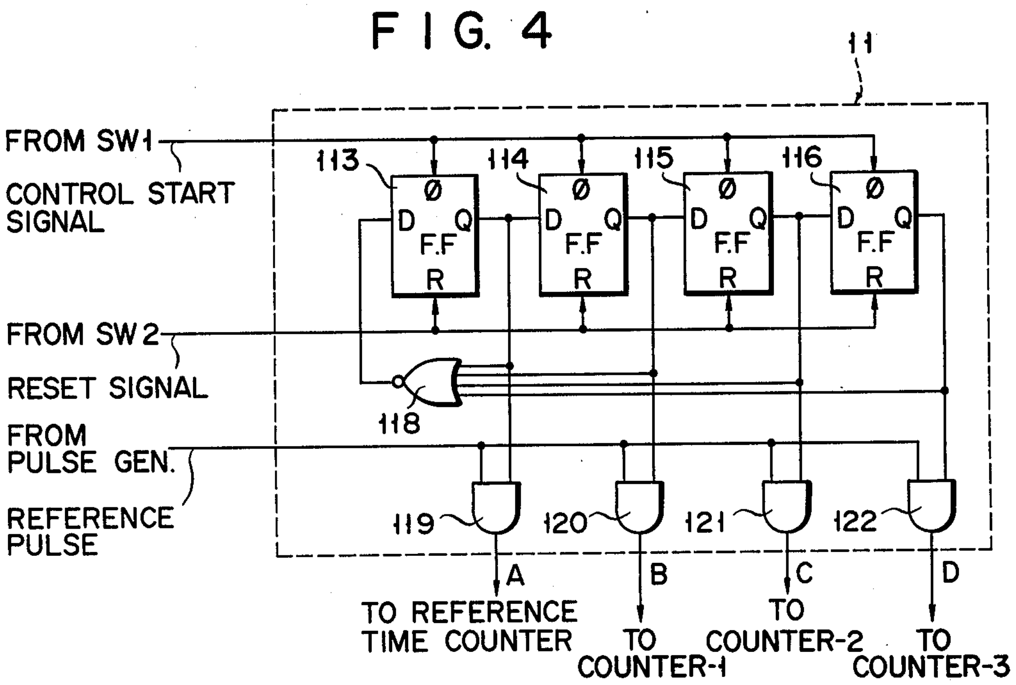
FIG. 4 is a circuit diagram showing a modification of the reference pulse control circuit shown in FIG. 2.

The reference pulse control circuit 11 may be constructed as the circuit shown in FIG. 4. The control circuit 11 is a simplification of the control circuit described above in reference to FIG. 2, with omission of the flip-flop 112 and the flip-flop 117. This permits the omission of the AND circuit 111, the OR circuit 123 and the AND circuit 124 and therefore the shift register is comprised of four stages. Thus, in the FIG. 4 circuit, like reference symbols are used to designate like parts or portions in FIG. 2. In the FIG. 4 circuit, only during the period that the flip-flops 113 to 116 are set, the AND circuits 119 to 122 corresponding to the flip-flops feed the reference pulses to the corresponding counters.

Figure 5:
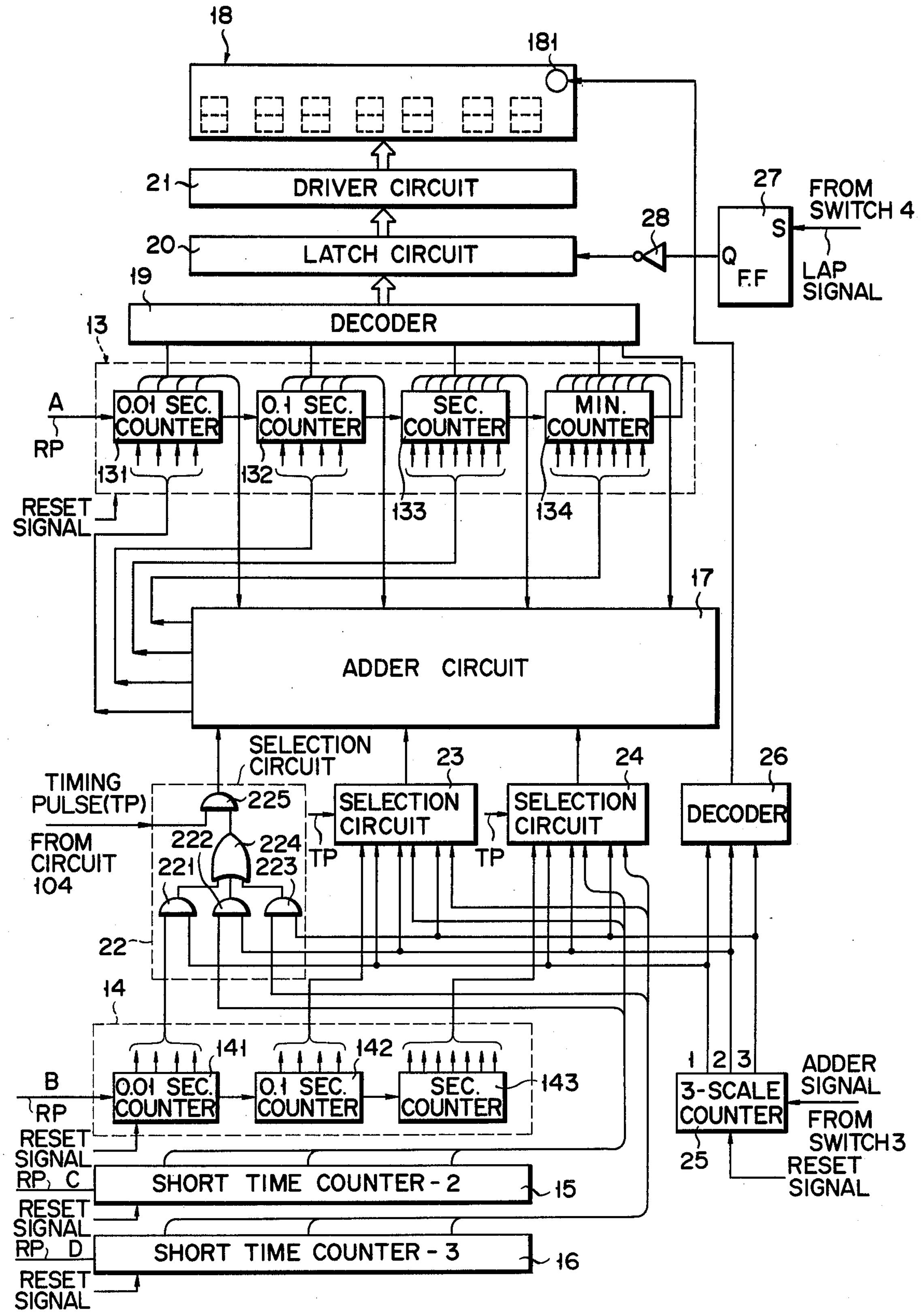
FIG. 5 is a circuit diagram of counters, adder circuit, a display circuit used in the chronograph according to the invention and its peripheral circuit.

FIG. 5 shows the detail of the circuit to count the reference pulses, and measure the time in response to the reference pulses to display it. The reference time counter 13 is comprised of a 0.01 sec. counter 131, a 0.1 sec. counter 132, a second counter 133, and a minute counter 134, these counters being connected in series. The 0.01 second counter 131, and 0.1 second counter 132 are decimal counters and output carries when they count 10 input pulses. Therefore, these counters 131 and 132 each are comprised of a single 4-bit digit. The second counter 133 and the minute counter 134 are each a scale-of-60 counter and output carries when they count 60 input pulses. The counters 133 and 134 are each comprised of 2 digits including a total of 7 bits. The short time counters 14, 15 and 16 are of the same construction, with a 0.01 second counter 141, a 0.1 second counter 142, and a second counter 143 being connected in series.

The contents of the reference time counter 13 is applied to the decoder 19 where it is decoded to a code suitable for time display. Further, the output of the decoder 19 goes through a latch circuit 20 and a drive circuit 21 to drive the display circuit 18 to display the time in the fashion x hour(s) xx minute(s) xx second(s) xx (the latter two digits being tenths and hundredths of a second. The selection circuits 22 to 24 are of the same construction, and select one of the short time counters 14 to 16, and direct the contents of th selected counter to the adder 17. The selection circuit 22 selects the 0.01 sec. counter; the selection circuit 23 the 0.1 sec. counter; the selection circuit 24 the seconds counter. The adder circuit 17 adds the contents of the reference counter 13 and of the respective short time counters in bit-parallel fashion and sets the result of the addition in the counter 13. The selection circuit 22 is provided with three AND circuits 221 to 223 used corresponding to the respective short time counters, an OR circuit 224 connected with the outputs of these AND circuits, and an AND circuit 225 connected with the output of the OR circuit 224 and for timing the addition operation. The AND circuit 221 selects the 0.01 second counter 141 in the short time counter-1 (14); the AND circuit 222 selects the 0.01 second counter in the short time counter-2 (15); and the AND circuit 223 selects the 0.01 second counter in the counter (16).

A scale-of-3 counter 25 counts an addition signal generated on each pushing of the switch SW3 to produce three signals (the selection signals to select a desired one of the short time counters) and feeds them to the selection circuits. These three selection signals are applied to the AND circuits 221 to 223 in the selection circuit 22. Accordingly, when the switch SW3 is actually once to provide the addition command, the addition signal is generated and the generated addition signal is counted by the scale-of-3 counter 25 with the result that the output "1" signal is supplied to the selection circuits 22 to 24. The selection circuits 22 to 24 select the contents of the 0.01 second counter, the 0.1 second counter, and the second counter of the short time counter 14. On the second actuation of the switch SW3, the scale-of-3 counter supplies the output "2" to the selection circuits 22 to 24 so that the short time counter 15 is selected. On the third actuation of the switch SW3, the scale-of-3 counter 25 supplies the output "3" to the selection circuits 22 to 24 thereby to select the short time counter 16. The output of the scale-of-3 counter 25 is applied to the decoder 26 where it is decoded into the decimal code which is in turn displayed in the appropriate display portion 181 of the display circuit 18.

When one desires to know the times of the competitors during the measuring operation, the switch SW4 is pushed to generate a lap signal to set the flip-flop 27 so that the output of the flip-flop 27 is inverted by the inverter 28 to be fed to the latch circuit. In response to this, the latch circuit 20 holds the measuring time from the decoder 19. Accordingly, the time measured at that time is displayed in the display circuit 18. Note here that, during this lap time display, the reference time counter 13 continues its time measuring operation without any disturbance of the time measuring. During the lap mode indication, the lap switch SW4 is pushed again to cause flip-flop 27 to be reset, thereby returning the lap mode indication to the time count indication mode.

Figure 6:
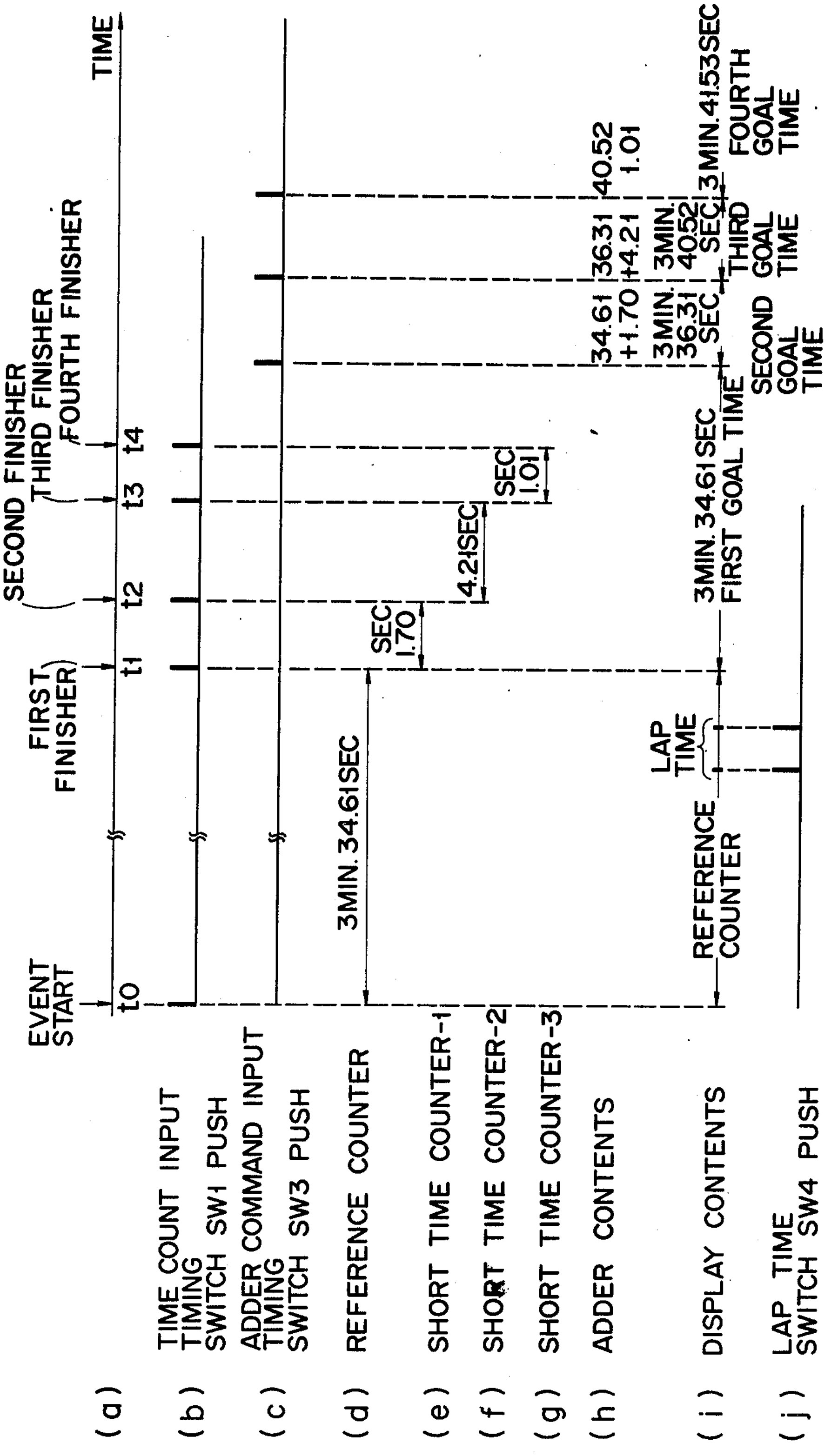
FIG. 6 is a timing diagram useful in explaining the method for measuring the competitor's times by using the chronograph according to the present invention.

The waveform diagrams of FIG. 6 will be referred to for explaining the operation of the invention for the case of by way of example, measuring the times of track events involving four runners.

Before the race is started, the switch SW2 is pushed to produce the reset signal which in turn resets the reference pulse control circuit 11, the reference time counter 13 and the short time counters 14 to 16, to "0". The display contents of the display circuit 18 displays "0's" in all the digits. As shown in FIG. 6(*a*), the four runners leave the starting line at time $t_0$, when a time measuring operator pushes the switch SW1 to time the timing input to generate the control start signal which in turn is fed to the reference pulse control circuit 11. See FIG. 6(*b*). The reference pulse control circuit 11 feeds the reference pulses through the AND circuit 119 to the reference time counter 13. Therefore, the reference time counter 13, as shown in FIG. 6(*d*), times the reference time interval. At this time, the display circuit 18 displays the contents of the reference time counter 13, as shown in FIG. 6(*i*). At the instant that the first of the runners reaches the finish line, the timing operator pushes the switch SW1 to provide the control starting signal to the control circuit 11 whereby the supply of the reference pulse is switched from the reference time counter 13 to the short time counter 14. Accordingly, the reference time counter 13, as shown in FIG. 6(*d*), stops and it has timed a reference time interval of, for example, three minutes and 34.61 seconds whereupon the short time counter-1 (14) starts its timing operation, as shown in FIG. 6(*e*). After time $t_1$, the display circuit displays the time of the first runner. Then, when the second runner reaches the finish line at time $t_2$, the time operator pushes the switch SW1 to stop the timing of the short time counter-1 (14) and start the timing of the short time counter-2 (15), as shown in FIG. 6(*f*). The short time counter-1 (14) stores the time difference between the first and second runners (e.g. $t_2-t_1=1.70$ sec.). Likewise, at times $t_3$ and $t_4$ when the third and fourth runners reach the finish line, the switch SW1 is pushed to store the timer differences (e.g., $t_3-t_2=4.21$ sec.) and (e.g., $t_4-t_3=1.01$ sec.) in the short time counters-2 and -3 (15) and (16).

When all of the runners reach the finish line, the timer pushes the switch 3 to provide the addition signal to the adder circuit 17, as shown in FIG. 6(*c*). In this case, the addition signal, in actuality, is applied to the scale-of-3 counter 25 shown in FIG. 5 to drive it. The output "1" of the counter 25 causes the selection circuits 22 to 24 to apply the contents of short time counter 14 to the adder circuit 17. In the adder circuit, the contents (3 minutes, 34.61 seconds) of the reference time counter 13 and the contents (1.7 seconds) of the short time counter-1 (14) are summed and the result of the addition (3 minutes and 36.31 seconds) is set in the reference time counter 13. Accordingly, the display circuit 18 displays 3 minutes and 36.31 seconds which is the time of the second runner. The output of the scale-of-3 counter shown in FIG. 5 is decoded by the decoder 26 to be displayed as and change "of rank" No. "2" of rank in the display portion 181 of the display circuit.

Similarly, when the switch SW3 is again operated the addition signals are generated and the rank numbers and the measuring times are successively displayed in the display circuit 18. As described above, the short time counters 14 to 16 may be of any type which time the time difference taken in the race and store them and may be constructed more simply than the reference time counter 13. As seen from the foregoing, the chronograph described above permits one timing operator to measure and record the times of all the four runners.

When the respective time differences of the runners are in excess of the timing range (0 to 60 seconds) of the short time counter, the switch SW4 is pushed, as shown in FIG. 6(*j*), to generate the lap signal which in turn sets the flip-flop 27 shown in FIG. 5 to invert the output of the flip-flop 27. The invert output is then fed to the latch circuit 20 in which the contents of the reference time counter 13 are held. In the display circuit 18, the lap time held in the latch circuit 20 is displayed. This permits the timer to measure a plurality of the lapsed times without stopping the reference time counter 13, by a single chronograph. Thus, according to the present invention, a single chronograph can measure and record a plurality of concurrently progressing times with high precision.

In the above-described embodiment, the adder circuit 17 adds the contents of the reference time counter 13 to one of the short time counters 14 to 16 in bit parallel fashion. But this addition of time may be effected in bit series fashion according to this invention, as will be described with reference to FIGS. 7 to 10.

Figure 7:
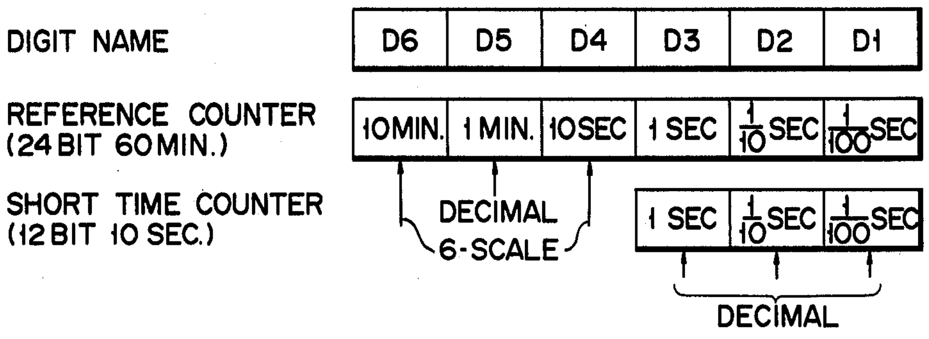
FIG. 7 is a diagram illustrating the digit format used with the reference counter and the short time counter.

If the display circuit 18 has six digits $D_1$ to $D_6$ as shown in FIG. 7(*a*), the reference time counter 13 should be a 24-bit, 60-minute counter and each short time counter should be a 24-bit, 10-second counter as shown in FIGS. 7(*b*) and 7(*c*). The reference time counter 13 and the short time counters 14 to 16 are each constituted by unit counters which measure time in different units to be displayed by the corresponding digits of the display circuit 18. For example, each short time counter is constituted by a "second" counter of 4 bits, a "1/10 second" counter of 4 bits, and a "1/100 second" counter of 4 bits.

Figure 9:
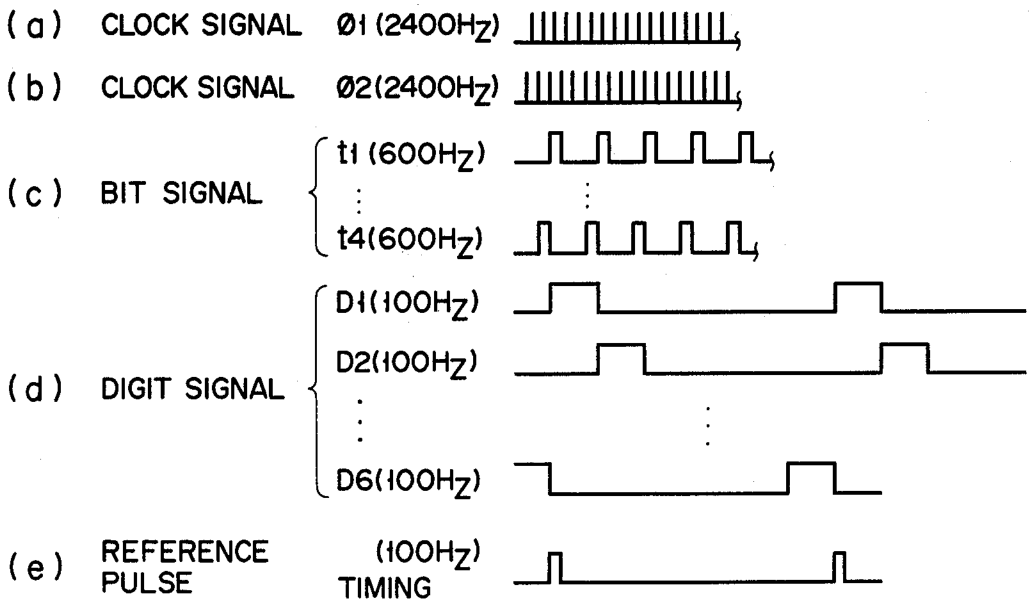
FIG. 9 is a waveform diagram illustrating further control signals generated during operation of the invention.
Figure 8:
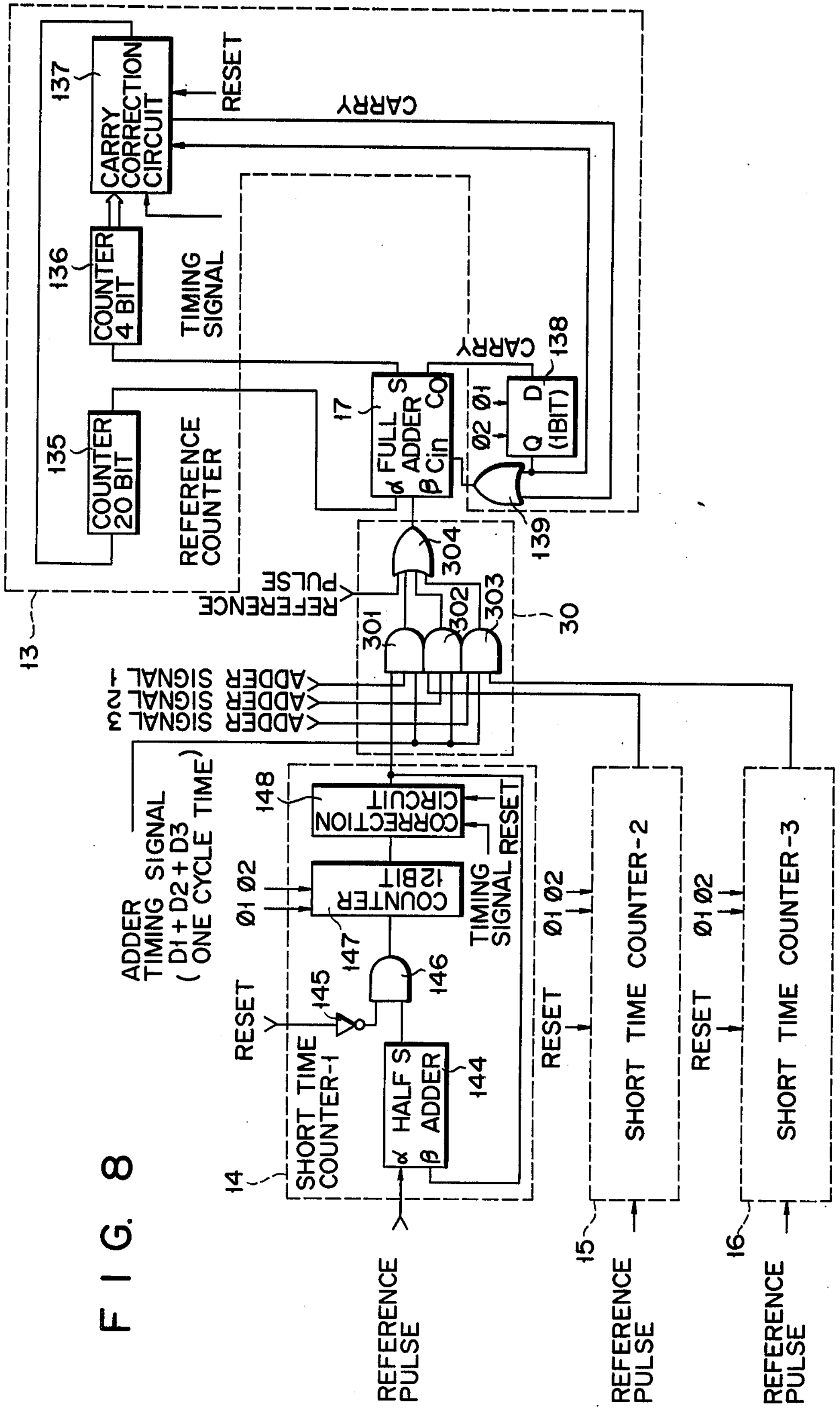
FIG. 8 is a diagram of a circuit for use with another embodiment of this invention.

As shown in FIG. 8, the short time counter 14 comprises a half adder 144, an AND circuit 146, a 12-bit counter 147 and a correction circuit 148. The half adder 144 receives a reference pulse RP. The AND circuit receives the output of the half adder 144 and a reset signal from an inverter 145. The output pulses of the AND circuit 146 are counted by the 12-bit counter 147, the contents of which are corrected by the correction circuit 148. The 12-bit counter 147 is so designed to count such clock pulses $\phi_1$ and $\phi_2$ as illustrated in FIGS. 9(*a*) and 9(*b*). The other short time counters 15 and 16 are similar in construction to the short time counter 14.

Connected to the short time counters 14 to 16 is a selection circuit 30 which selects one of the short time counters 14 to 16. The selection circuit 30 comprises AND circuits 301 to 303 and an OR circuit 304. The AND circuits 301 to 303 receive the outputs of the short time counters 14 to 16, respectively and an adder signal which is generated every time when the switch SW3 is pushed. The OR circuit 304 receives the outputs of the AND circuits 301 to 303 and a reference pulse. Each AND circuit 301, 302 or 303 receives an adder timing signal, the pulse width of which is necessarily equal to that of a 3-digit pulse.

The reference time counter 13 comprises a 20-bit counter 135, a 4-bit counter 136, a carry correction circuit 137, a shift register 138 and an OR circuit 139. The shift register 138 delays a carry signal for 1 bit from the adder circuit 17, and the OR circuit 139 receives a carry signal from the carry correction circuit 137 and the output of the latch circuit 138.

When the switch SW3 is pushed once, an adder signal 1 is supplied to the AND circuit 301 of the selection circuit 30. Thus the short time counter 14 is selected, and its contents are supplied to the adder circuit 17 through the OR circuit 304 of the selection circuit 30. At the same time, the contents of the 20-bit counter 135 of the reference time counter 13 are supplied also to the adder circuit 17. The contents of the reference time counter 13 are therefore added to the contents of the short time counter 14 in bit parallel fashion. More precisely, the contents of the "1/100 second" counter of the short time counter 14 are first added to the contents of the "1/100 second" counter of the reference time counter 13. The sum obtained by this addition is fed to the 20-bit counter 135 through the 4-bit counter 136 and the carry correction circuit 137. A carry signal, if emitted from the adder circuit 17, is delayed by the shift register 138. The output signal of the shift register 138 is fed to the carry-in terminal of the adder circuit 17 through the OR circuit 139 and is to be added to the sum of the contents of "1/10 second" counters of the short time counter 14 and the reference time counter 13.

The relationship between the various timing signals used in this embodiment is shown in FIG. 9. Clock pulses $\phi_1$ and $\phi_2$ have a frequency of, for example, 2,400 Hz. Bit signals $t_1$ to $t_4$, which initiate addition of bits, have a frequency of, for example, 600 Hz. Digit signals $D_1$ to $D_6$, which start the addition of time to obtain the digital information to be displayed by the display circuit 18, have a frequency of, for example, 100 Hz.

Figure 10:
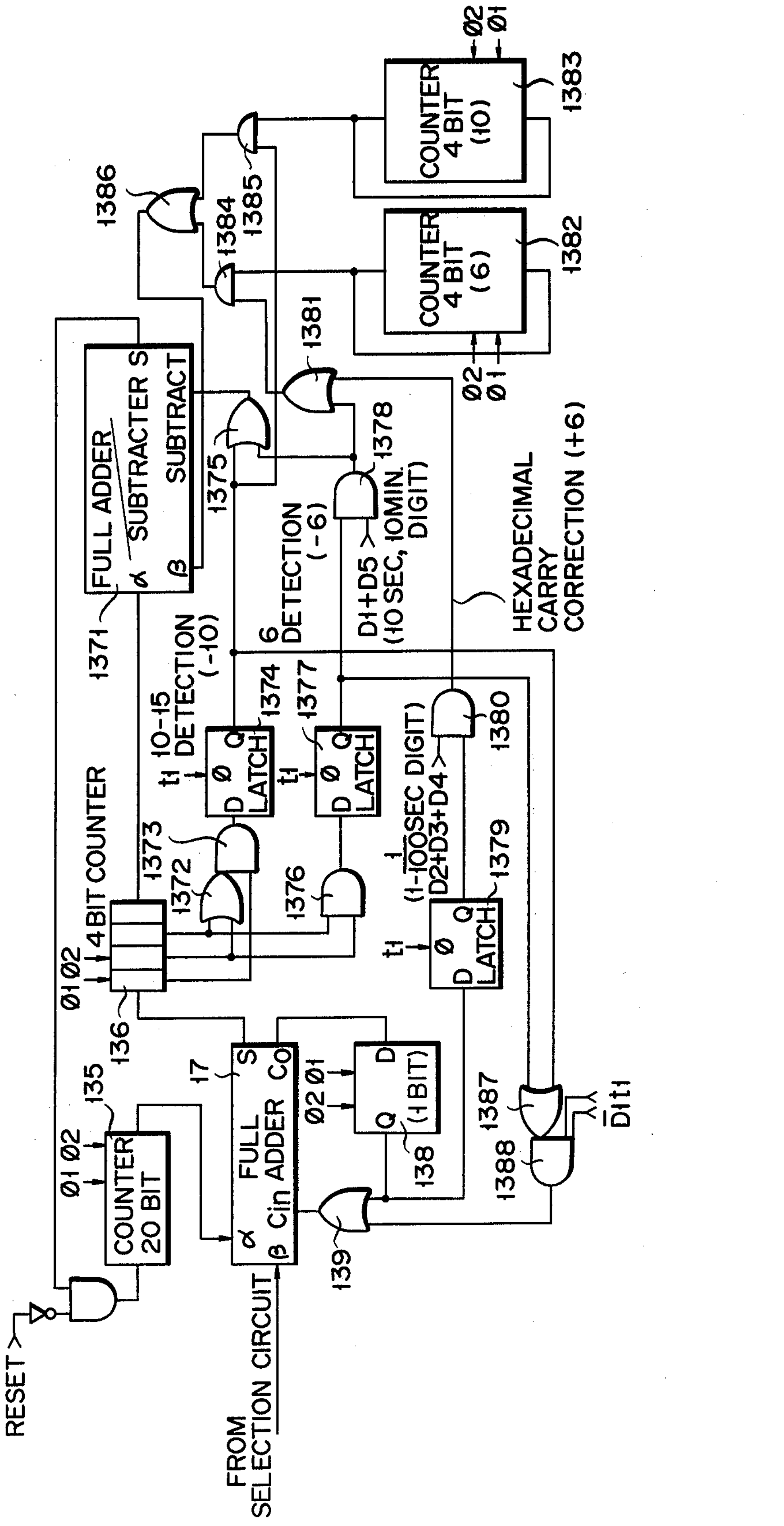
FIG. 10 is a detailed circuit diagram showing the carry correction circuit of FIG. 8.

With reference to FIG. 10 the carry correction circuit 137 will be described in detail.

The adder circuit 17 effects addition in accordance with the hexadecimal system. Thus, the result obtained by the adder circuit 17 should be converted into 6-scale value in case the inputs to the adder circuit 17 are of 6-scale value or into decimal value in case the inputs are of decimal value.

If the sum of the 6-scale outputs of the reference time counter 13 is equal to "6", value "6" is taken from the sum to produce a 6-scale carry. This operation is done by an AND circuit 1376, a latch circuit 1377, an AND circuit 1378, an OR circuit 1381, an AND circuit 1384, a 4-bit counter 1382, an OR circuit 1386, an OR circuit 1375 and a full adder/subtracter 1371. If the sum of decimal outputs of the reference time counter 13 and the selected short time counter ranges from "10" to "15", the value "10" is taken from the sum to produce a decimal carry. This is achieved by an OR circuit 1372, an AND circuit 1373, a latch circuit 1374, an OR circuit 1375 a 4-bit counter 1383, and an AND circuit 1385, and a full adder/subtracter 1371. If the sum of decimal outputs of the reference time counter 13 and the selected short time circuit is "16" or more, the adder circuit 17 produces a carry signal. In this case, the carry signal from the adder circuit 17 is converted into a decimal carry. To make up for the difference between the hexadecimal carry and the decimal carry, the value "6" is supplied to the full adder/subtracter 1371. The conversion of carry signal and the addition of value "6" are carried out by a latch circuit 1379, an AND circuit 1380, an OR circuit 1381, a 4-bit counter 1382, an AND circuit 1384, an OR circuit 1386 and the full adder/subtracter 1371.

The carry correction circuit 137 is further provided with an OR circuit 1387 and an AND circuit 1388. The OR circuit 1387 receives a 6-scale carry and a decimal carry. The AND circuit 1388 produces an output when it receives the output of the OR circuit 1387, digit signal $D_1$ and bit signal $t_1$. The output of the AND circuit 1388 is supplied to the adder circuit 17 via the OR circuit 139. Namely, the carry correction circuit 137 performs its function in response to such various timing signals as shown in FIG. 9.

It will be apparent to those skilled in the art that various modifications and variations can be made in the system of the present invention in addition to those described hereinabove without departing from the scope or spirit of the invention. Thus, it is intended that the present invention cover all modifications and variations of this invention provided they come within the scope of the appended claims and their equivalents.

I claim:

1. A chronograph for measuring a plurality of time intervals comprising:

reference pulse generating means for generating time count reference pulses;

reference time counting means for counting said reference pulses to measure a reference time interval;

short time counting means for counting said reference pulses after said reference time counting means stops its counting operation to measure a short time interval succeeding said reference time interval;

first control means including a time count input start button for generating a sequence of first control signals in response to sequential actuation of said start button, said first control signals operating to apply said time count reference signals first to said reference time counting means and then to said short time counting means whereby said reference time interval is measured first followed by measurement of said short time interval;

second control means including an addition command start button operable to generate an addition signal;

adder means for summing the contents of said reference time counting means and said short time counting means in response to said addition signal;

means for transferring the output of said adder means to said reference time counting means; and display means for displaying the contents of said reference time counting means, whereby upon actuation of said second control means the sum of said reference time interval and said short time interval is displayed.

2. The chronograph according to claim 1, in which said first control means includes "N" AND circuits for supplying said reference pulses and further includes a shift register of "N" stages, the outputs of which are connected to the inputs of said AND gates and which shifts the information stored therein on each generation of said first control signal, and a NOR circuit for processing the outputs of said shift register to apply a NOT-OR output to the input stages of said shift register.

3. The chronograph according to claim 1, in which said first control means includes a first flip-flop to set up the start and stop time to feed said reference pulses, a shift register comprised of "N" flip-flop stages for shifting the information stored therein in response to each of said first control signals, said first flip-flop being reset by the output of the final stage of said shift register, a NOR circuit in which the outputs of "N−1" stages of said shift register are processed to apply a NOT-OR output to the input stage of said shift register, and (N−1) AND circuits connected correspondingly to said (N−1) stages of said shift register and in common to the output of said first flip-flop for feeding said reference pulses in sequence to said reference time and short time counting means.

4. The chronograph according to claim 1, in which said reference counting means is capable of measuring time within a first time range and includes a plurality of counters connected in count-up series, and in which said short time counting means is capable of measuring time within a second time range and includes a plurality of counters connected in count-up series, said second time range being considerably shorter than first time range.

5. The chronograph according to claim 4, further comprising a selection means which is connected commonly between said adder means and said short time counting means and selects one of said short time counters in response to the output of a counter which counts each reception of said addition signal and feeds the contents of the selected short time counter to said adder means.

6. The chronograph according to claim 5, in which said selection means includes a plurality of AND circuits provided corresponding to said respective short time counters, an OR circuit for logically summing the outputs of these AND circuits, and an AND circuit for taking the addition timing together with the output of the OR circuit.

7. The chronograph according to claim 1, further comprising a lap means for temporarily stopping the displayed time interval including a flip-flop which is set by a lap signal generated by pushing a lap switch and is reset by pushing said lap switch again, an inverter for inverting the output of the flip-flop, and a latch circuit which is provided between said display circuit and said reference time counting means for sustaining the contents of said display in response to the output of said inverter.

8. The chronograph according to claim 1, wherein said adder means operates according to hexadecimal notation and wherein said reference time counting means further comprises carry correction means including a circuit for obtaining a decimal carry when the result of the addition effected by said hexadecimal adder means ranges from "10" to "15", a circuit for converting a hexadecimal carry into a decimal carry when the result of said addition is "16" or more, and a circuit for obtaining a 6-scale carry when the result of said addition ranges from "6" to "10".

* * * * *